Patented Oct. 17, 1939

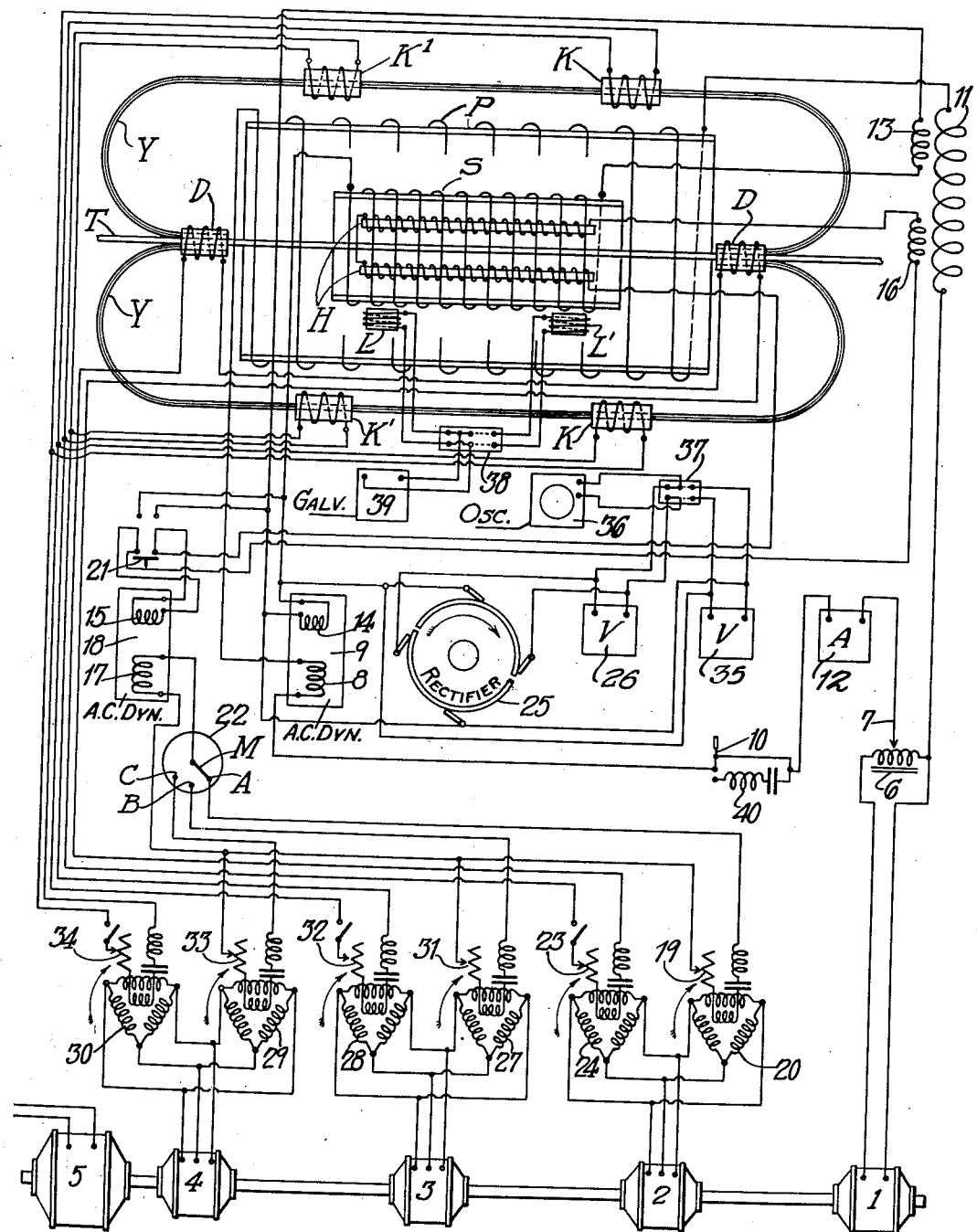

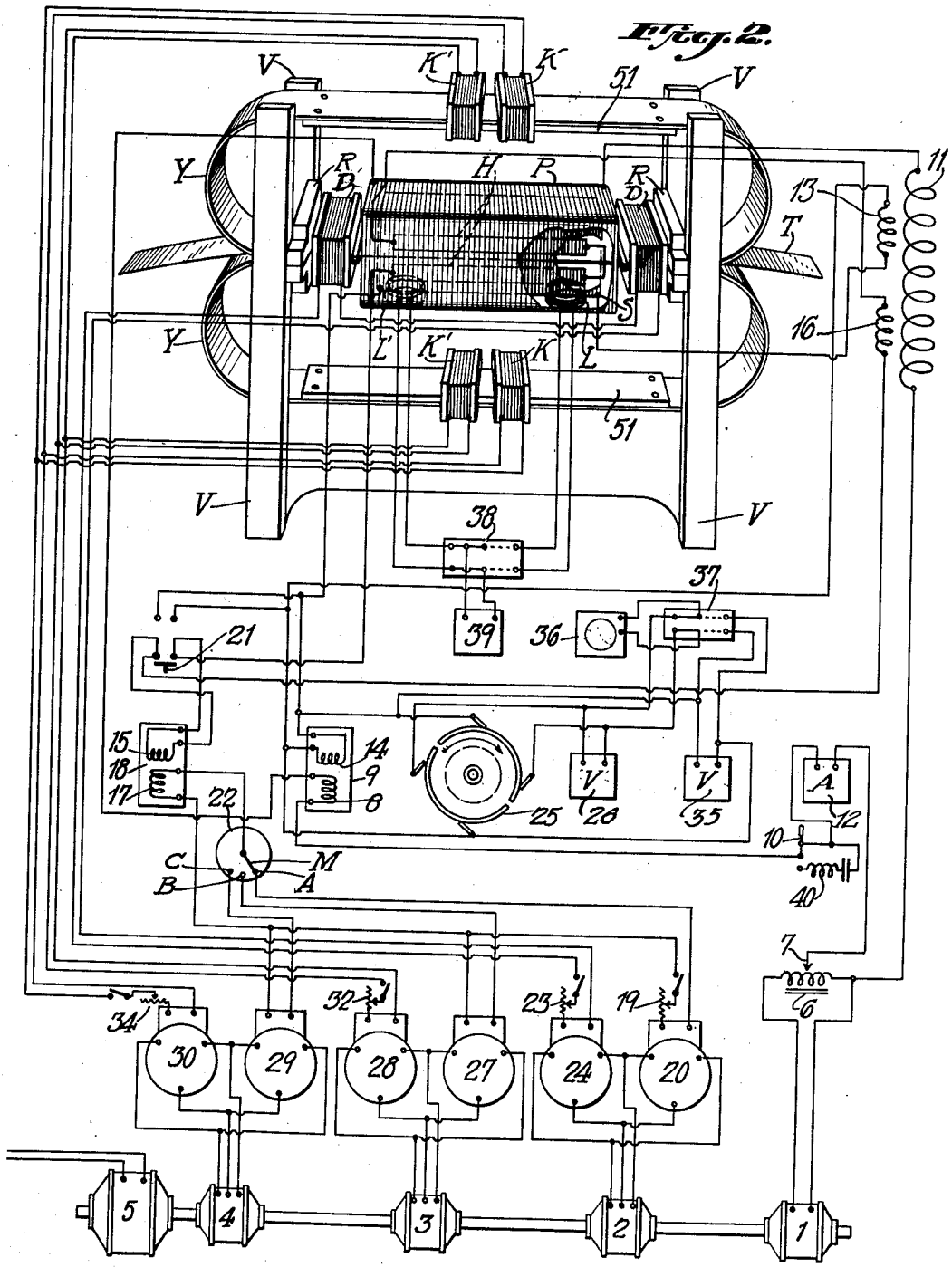

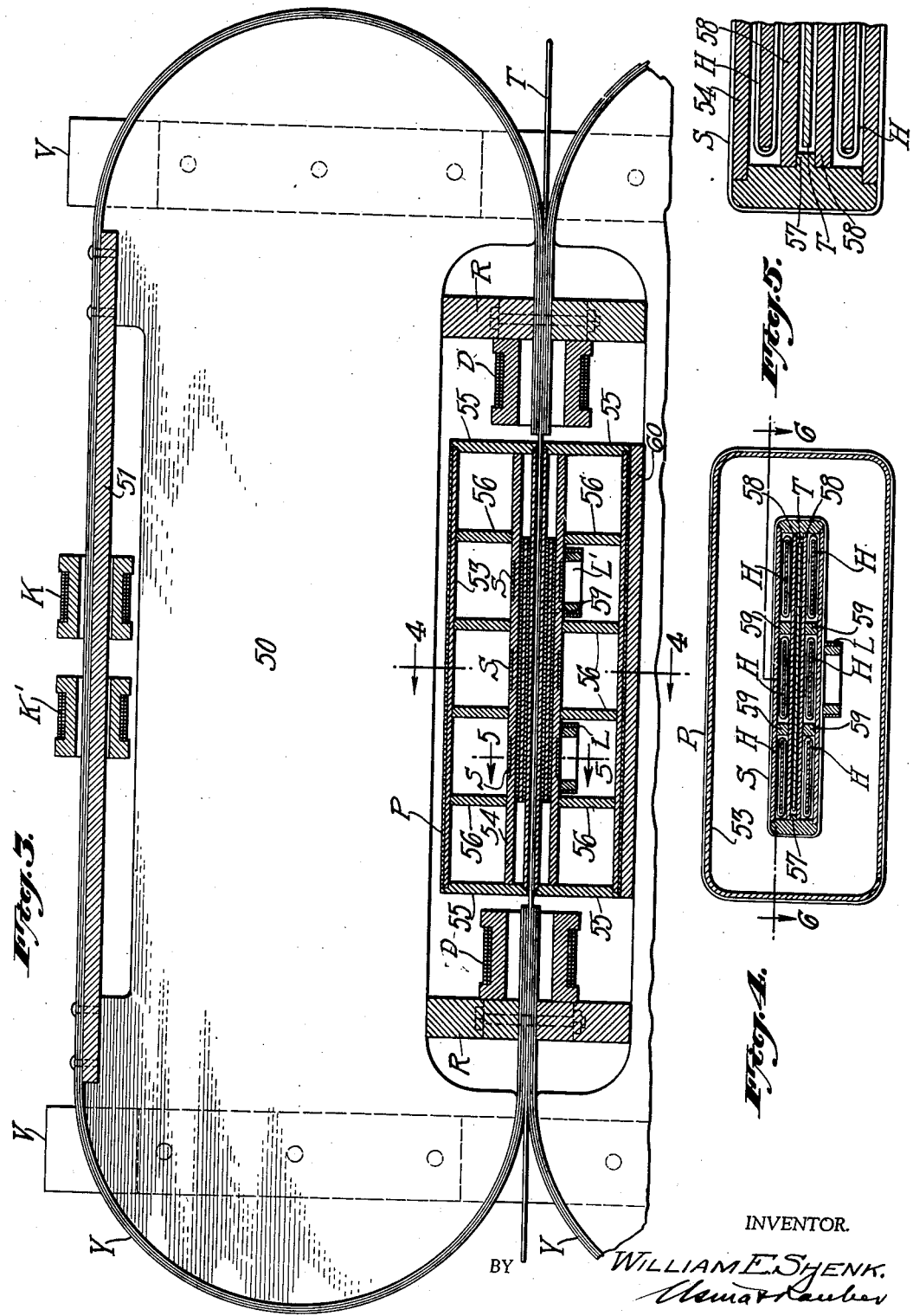

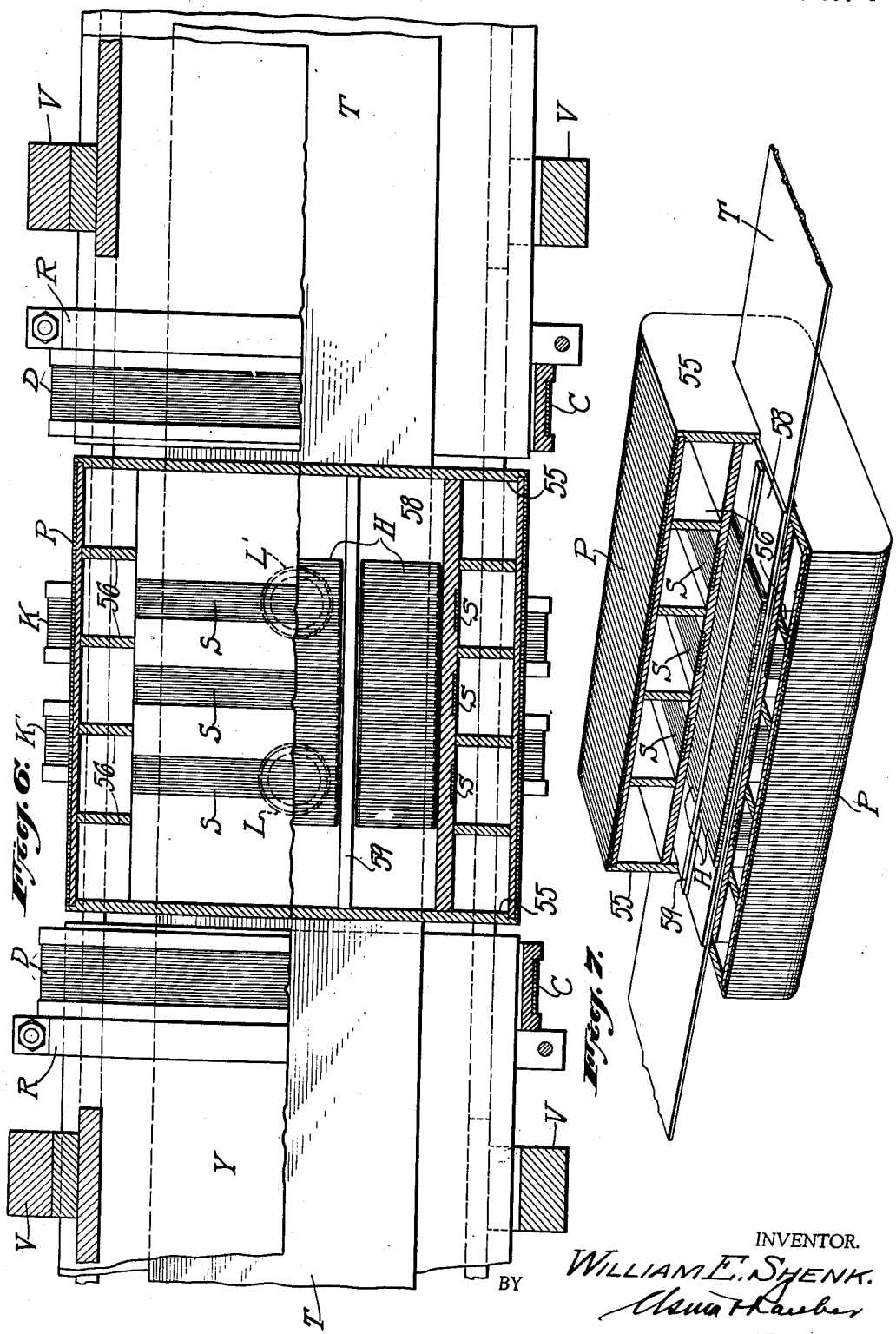

2,176,279

UNITED STATES PATENT OFFICE 2,176,279

METHOD AND APPARATUS FOR MAGNETICALLY TESTING MATERIALS

William E. Shenk, East Orange, N. J., assignor to United States Steel Corporation, New York, N. Y., a corporation of New Jersey Application May 12, 1937, Serial No. 142,260

20 Claims. (Cl. 175—183)

This invention relates to electromagnetic tester devices and more particularly to a device adapted to determine the magnetic characteristics of individual and either small or relatively large sized sheets or strips comprised of ferro-magnetic material.

One of the objects of the present invention is to provide a magnetic tester device adapted to determine the magnetic properties of materials such as sheets or strips comprised of iron and ferrous metal alloys, without consequent loss and destruction of the said material. Another object of this invention is to provide means for determining the magnetic properties of each individual ferrous metal sheet or strip which goes into the making of electrical devices such as transformers, electric motors, watt-hour meters and the like. Still another object is to provide means to determine the magnetic properties of ferrous metal strips and sheets at relatively high flux densities. Other objects and advantages will be apparent as the invention is more fully disclosed.

In accordance with these objects I have designed a magnetic tester device which is essentially an improvement of the device described by J. Schneider (Archiv für Elektrotechnik, vol. 24, pages 651–678, dated December 5, 1930).

In the device of this publication a determined length of the specimen to be tested is included within a closed magnetic circuit. A primary magnetizing coil encloses substantially the entire determined length of the specimen and a secondary coil encloses a center portion of this determined length. Means are provided to energize the magnetizing coil with a determined alternating magnetizing current. Means are provided to apply sufficient additional magnetomotive force to the closed magnetic circuit to induce in the determined length of the specimen a magnetic condition substantially equivalent to that which would exist therein if the said length was a part of an endless core of the same and uniform cross-section and the magnetizing coil was an endless coil enclosing the endless core and was provided with uniform winding of the same number of turns per unit of length present in the said magnetizing coil.

Means are provided to adjust the ration of the magnetizing force acting on the specimen and the primary magnetizing current to satisfy the formula $H = .4\pi NI$ (where H equals the magnetizing force, N equals the number of turns per unit of length in the magnetizing coil and I equals the magnetizing current in amperes). And means are provided to obtain a wattmeter measurement of the energy losses occurring in the center portion of the specimen covered by the said secondary coil while the magnetic flux is present therein.

I have found that it is essential, particularly when relatively high flux densities are employed, to provide means to adjust the form factor of the device (the r. m. s. (alternating current) voltage divided by the average (direct current) voltage induced in a secondary winding covering the length of specimen to be tested) to approximate 1.111 before any accurate measurement of the energy losses in the specimen may be obtained. Accordingly I have modified the Schneider device to provide means to adjust the form factor to approximately 1.111 before making the energy loss determination. I have further modified the Schneider device to provide means to obtain a permeability measurement on the specimen. I have also modified the Schneider device structurally to provide a commercially practical magnetic tester device adapted for testing relatively large specimens such as whole sheets and have simplified the electrical circuits associated therewith materially. These and other modifications of the Schneider device will be apparent as the invention is more fully disclosed.

Before further disclosing the present invention reference should be made to the accompanying drawings wherein:

Fig. 1 is a schematic diagram of the magnetic testing device of the present invention including the associated electrical apparatus elements and electrical circuits essential to the same; Fig. 2 is a perspective view partly in section of the tester device with the associated electrical apparatus and circuits indicated diagrammatically; Fig. 3 is a side elevation partly in section of the apparatus of the present invention; Fig. 4 is a sectional view along plane 4—4 of Fig. 3; Fig. 5 is an enlarged view along plane 5—5 of Fig. 3; Fig. 6 is a horizontal view along successive planes approximately along staggered line 6—6 of Fig. 4; and Fig. 7 is a perspective view partly in section.

Referring to the drawings, Fig. 1 schematically illustrates the apparatus elements and the electrical circuits and instruments associated therewith representative of the present invention. A determined length of the specimen T is placed in bridging relation across the ends of two C-shaped yoke members Y—Y lying above and below the length of specimen T. Primary energizing coil P encloses and surrounds substantially the full length of the specimen. Enclosed within the primary coil P and also enclosing and surrounding a center portion of the specimen length T is secondary coil S. Within secondary S are disposed, in the air gap above and below the specimen T, a plurality of coils H electrically connected in series. Yoke compensating coils D—D are disposed adjacent the ends of primary coil P in a position to substantially enclose the overlapping portions of yokes Y—Y and specimen T. Additional yoke coils (not shown) may be added to other portions of the yoke and connected with coils D—D if necessary.

An alternating magnetic flux is induced within the closed magnetic circuit comprising yokes Y—Y and specimen length T by energizing the primary coil P with an alternating current of known frequency (60 cycle) having essentially sine wave characteristics, and the magnitude of this current is adjusted to produce a desired flux density within the closed magnetic circuit. The energization of primary coil P is obtained in accordance with the schematic wiring diagram indicated in Fig. 1 by alternating current from generator 1 driven by synchronous motor 5. This current passes first through iron-core autotransformer 6 wherein means 7 is provided to regulate the magnitude of the current drawn therefrom. The current before passing to one side of the coil P from iron-core auto-transformer 6 passes through the primary 11 of an air core mutual inductance. The opposite end of coil P is connected to the field coil 8 of dynamometer (or wattmeter) 9, thence to switch 10 and ammeter 12 and back to auto-transformer 6. The entire primary magnetizing circuit is so constructed as to have the lowest possible impedance.

Upon energizing primary coil P an alternating magnetic flux is induced within the closed magnetic circuit thereby inducing an electromotive force in secondary coil S. Before any determination of magnetic losses can be made the relation between the magnetizing force acting on specimen T and the current flowing in primary coil P must be adjusted to satisfy the formula $H=.4\pi NI$ (where H equals the magnetizing force, N equals the number of turns per unit of length in the magnetizing coil P and I equals the magnetizing current in the coil P in amperes). It is also necessary to adjust the form factor of the secondary voltage (the r. m. s. or root mean square voltage divided by the average voltage during a half cycle in the secondary coil S) to a value approximating 1.111.

The adjustment of the magnetizing conditions to satisfy the formula above identified is obtained through the medium of coils H and D—D. Coils H have a voltage induced in them which is proportional to the flux density present in the air space they occupy within the coils S. The magnetizing force producing this flux density is numerically equal to the magnetizing force applied to the specimen T. I therefore connect the plurality of coils H in series and in series opposition therewith I electrically connect secondary winding 16 of the air core mutual inductance. Secondary winding 16 has been empirically designed and coupled with primary 11 to develop by induction from the alternating current flowing in the primary 11 a voltage exactly equal to the voltage that would be induced in the plurality of coils H if the relation $H=.4\pi NI$ were satisfied. The resultant of the bucked voltages of coils H and 16 is applied through switch 21 to the moving coil 15 of dynamometer 18. The field coil 17 of dynamometer 18 is then energized by a sinusoidal alternating current of exactly the same frequency as present in primary coil P from generator 2 by connecting switch arm M of switch 22 to contact A and the phase relation of the current in the field coil 17 is adjusted by phase shifter 20 until a zero deflection of the dynamometer 18 is obtained. This indicates that the currents in the fixed and moving coils 15 and 17 of dynamometer 18 are in quadrature.

I then energize yoke compensating coils D—D with alternating current of exactly the same frequency as present in the primary coil P and on field coil 17 and adjust the magnitude and the phase relation of this current by means of variable resistance 23 and phase shifter 24 until the voltage induced by coils D—D in coils H exactly reduces the resultant voltage in the H coil circuit (H coils, secondary 16 and coil 15 of dynamometer 18) to zero as shown by the deflection of dynamometer 18 being zero for any setting of phase shifter 20. When this electrical condition has been obtained the electrical conditions satisfying the formula $H=.4\pi NI$ has been satisfied. Under these conditions the magnetization of the length of specimen T is substantially identical to that which would be present therein if the said length of specimen was a part of an endless core of substantially the same cross-sectional area and of the same material and the primary coil P was an endless coil enclosing the said endless core and was provided with uniform windings of substantially the same number of turns per unit of length as present in the primary coil P.

Under these conditions and in accordance with the teaching of the Schneider publication above identified the form factor should approximate 1.111 and an accurate wattmeter measurement of the energy losses present in the length of specimen defined by the secondary winding S can be obtained. But I have found that distortion in the sine wave form of the induced secondary voltage appearing in secondary coil S as a result of the presence of various harmonics of the fundamental in the alternating magnetic flux precludes the obtainance of a form factor of 1.111 particularly at relatively high flux densities. I therefore provide means to eliminate this distortion in the sine wave form of the induced secondary voltage, so that the desired form factor of 1.111 may be obtained.

The means that I provide is adapted to substantially neutralize these harmonic components as indicated by the reduction of the corresponding harmonic voltages induced in secondary coil S to zero. Briefly stated, I impress upon the closed magnetic circuit an alternating magnetic flux of the same frequency as the frequency of the harmonic component causing the distortion and adjust the magnitude and the phase relation of the same until the distorting and the added magnetizations exactly equal and oppose each other. Where more than one harmonic is present and causing distortion I repeat the procedure until each of the harmonics has been effectively equalled and the distorting effect of the same eliminated from the voltage induced in the secondary coil S. Thereupon a wattmeter reading of the energy losses may be obtained which is substantially accurate. For most purposes I have found that it is sufficient to eliminate the third and fifth harmonics, the magnitude of the other harmonics being insufficient to deleteriously effect the wattmeter determination.

In accordance with this invention I dispose on yoke Y a plurality of pairs of coils K—K and K'—K', one pair of coils for each harmonic which is to be eliminated. Coils K—K, for example, are disposed on each yoke Y—Y and are electrically connected in parallel with each other and through a phase shifter 28 to a source of alternating current such as generator 3 having a frequency substantially identical to the third harmonic of the primary magnetizing current on coil P. The magnitude of the current in coils K—K may be adjusted by means of rheostat 32. The field coil 17 of dynamometer 18 is excited by alternating current of the same frequency through switch 22 by changing moving arm M over to contact B and phase shifter 27 is electrically connected in circuit therewith to provide means to adjust the phase relation of the current in coil 17 into quadrature with the third harmonic voltage of the secondary S on moving coil 15 (switch 21 is in the up position for this compensation) in exactly the same manner as heretofore described. The magnitude of the current in coils K—K and the phase relation of the same is adjusted until the induced harmonic magnetic flux exactly neutralizes the corresponding distortion in the magnetic flux in the magnetic circuit as indicated by the deflection of dynamometer 18 being zero for all positions of phase shifter 27.

Where it is desired to eliminate the fifth harmonic of the primary energizing current coils K'—K' also electrically connected in parallel are energized by alternating current from generator 4 and the magnitude and the phase relation of the same is adjusted by means of rheostat 34 and phase shifter 30 as heretofore described until the flux induced in the closed magnetic circuit by coils K'—K' exactly equals and opposes the distorting harmonic flux generated by coil P and a zero deflection in dynamometer 18 is obtained.

Before the energization of coils K'—K' by current from generator 4 the field coil 17 of dynamometer 18 is energized by current from the same source by shifting moving arm M of switch 22 to contact C and the phase relation of this current to the induced secondary fifth harmonic voltage applied to moving coil 15 is adjusted by phase shifter 29 until the two currents are in quadrature as heretofore described.

The obtainance of an accurate wattmeter measurement of the energy losses per unit of mass involves the measurement of the induced secondary voltage due to the flux in the specimen and thereby determining the maximum flux density in the determined portion of the specimen being measured when the form factor of the induced secondary voltage approximates a value of 1.111.

As hereinabove described by means of coils H and yoke compensating coils D—D and associated electrical circuits I obtain a magnetizing condition within the length of the specimen T conforming to the formula $H=.4\pi NI$. By means of yoke coils K—K (K'—K') I substantially eliminate the magnetic effect of the various harmonics of the primary magnetizing current applied to primary coil P. The induced voltage then appearing in secondary coil S should evidence a form factor (root means square voltage divided by the average voltage) of approximately 1.111.

However the induced secondary voltage consists of two components only one of which is desired. This component is due to the flux in the specimen and must be measured separately. The other component is due to the flux in the air space included within the secondary and outside of the specimen. Fortunately this undesired component which makes the secondary voltage appear too high is strictly proportional to the magnetizing force H which has been made equal to $.4\pi NI$ as has been shown above. This undesired component is therefore strictly proportional to the magnetizing current I also. I have therefore connected in series opposition with the secondary S secondary 13 of the air core mutual inductance to cancel out this undesired induced voltage component. The number of turns of secondary 13 is adjusted to give a voltage exactly equal to this unwanted component when the magnetizing current I flows in the primary 11 of the air core mutual inductance so that the net induced voltage in the secondary circuit as read on voltmeter 26 is due to and strictly proportional to the flux in the determined portion of the specimen. It is to be understood that secondary 13 was in the circuit when the adjustment of the currents supplied to yoke coils D—D, K—K and K'—K' was made. The field coil 8 of dynamometer 9 is excited by the known primary magnetizing current I. The net induced voltage in the secondary circuit is applied across the terminals of rectifier 25 and across the terminals of alternating current voltmeter 35. The direct current output of rectifier 25 is impressed across direct current voltmeter 26. The meter reading of voltmeter 35 divided by the meter reading of voltmeter 26 should approximate the value 1.111. To check the wave form of the net secondary voltage I provide an oscillograph 36 (preferably a cathode ray oscillograph which draws no appreciable current from the circuit) and switch 37 whereby the direct current from rectifier 25 or the alternating current of the induced secondary voltage may be passed therethrough to obtain a visual indication of the wave form.

The deflection obtained on dynamometer 9 when the relation $H=.4\pi NI$ has been satisfied as above and when the meter reading of voltmeter 35 divided by the meter reading of voltmeter 26 approximates the value 1.111, represents the total losses in watts occurring in the length of the specimen T enclosed by the secondary coil S. This total must be converted by mathematical calculation into losses per unit of mass in accordance with well known formula.

As a further check on the accuracy of the determination I dispose leakage coils L, L' adjacent opposite ends of the secondary coil S with their coil axes perpendicular to the axis of the secondary coil and connect these coils through switch means 38 to galvanometer 39. If the magnetic flux in the air space at the point of location of coils L—L' is parallel to the axis of coils P and S, coils L—L' will not show any induced current. If there is any magnetic flux straying from the desired parallel path in this area a current will develop in coils L—L' and cause a deflection in galvanometer 39. If a deflection is obtained in galvanometer 39 it indicates that the secondary winding on coil S is either too long or that compensating coils D—D are located too far from the ends of primary coil P, and the necessary adjustment may be made in the apparatus to correct this undesirable condition. Once corrected it is usually unnecessary to repeat the test until the conditions of test are markedly varied from the conditions then existant.

It is sometimes desirable to obtain a permeability measurement upon this mass of material. This may be obtained by throwing switch 10 in the primary energizing circuit over to a position putting (60 cycle) filter 40 (if that is the frequency of the magnetizing current from source 1) in series in the primary energizing circuit. The current reading on ammeter 12 multiplied by the square root of 2 will give the value of the magnetizing current. By adjusting the adjusting magnetizing force relative to the magnetizing current to conform to the formula $H=.4\pi NI$ as hereinabove described (but not energizing yoke coils K—K and K'—K' as in the core loss measurement), a determination of maximum magnetizing ($H_{max}$) force may be obtained, the maximum flux density ($B_{max}$) may be determined from the reading of voltmeter 26 as in the core loss measurement and the permeability of the specimen may then be calculated from the formula $B_{max}$ divided by $H_{max}$, where B equals flux density and H equals magnetizing force.

Referring to Figs. 2 to 7 inclusive, the structural features of the present invention independently of the electrical features may be observed. In Fig. 2 the structural features are illustrated in perspective with the electrical features in schematic detail similarly to that indicated in Fig. 1. In its simplest definition, the coils P and S are concentrically sustained in fixed relation one within the other, between vertical supports V with the hollow core opening of the coils P and S lying substantially horizontally. C-shaped yokes Y—Y are supported upon supports V in such manner as to bring their opposite ends in overlapping engagement along a horizontal plane lying along substantially the center axis of the coils P and S. Means to horizontally sustain a length of sheet or strip material T (test piece T) in bridging relation across the space gap and through the core of coils P and S is provided (but not shown in Fig. 2). And means are provided to sustain yoke compensation coils D—D adjacent opposite ends of coil P in a position to substantially enclose the overlapping portions of yoke Y—Y and test piece T. Means R is provided to clamp the overlapping portions of yokes Y—Y and test piece T together thereby to reduce mechanically the size of any space gap therebetween.

As indicated in Figs. 2 and 3 yokes Y—Y are comprised of a plurality of sheets or strips of magnetic material, such as sheets of transformer iron material each of which are wider than the sheet of material to be tested. I prefer to employ at least three sheets and prefer each sheet to have a width at least 1½ times the width of the sheet to be tested. For most efficient results the cross-sectional area of the yokes Y—Y should be approximately ten times that of the specimen to be tested.

Yokes Y—Y are preferably retained in shape except at the ends by means of profile members 50 disposed adjacent each side edge. The ends of the yoke are left free to make spring contact with the sheet of material to be tested on opposite sides thereof. Stiffening boards 51 are provided to support the horizontal length of yokes Y—Y and recesses are provided in the profile members 50 to permit coils K—K (K'—K') to be mounted on the yokes Y—Y substantially as indicated.

The magnetizing coil assembly is indicated in Figs. 3 to 7 inclusive. It is essential that the spaced relation between primary and secondary windings be maintained constant, also the location of the test sheet T within the coil core along a horizontal plane substantially along the coil axis. The location of the coils H within the air space above and below the specimen T should also be fixed and constant relative to the coils P and S and specimen T.

To obtain this result I have devised the coil structure indicated in Figs. 3 to 7 inclusive, wherein the primary and secondary coils respectively are wound upon hollow rectangular shaped spools 53 and 54 which are nested together and retained in desired spaced relation by end sections 55. Spacer elements 56 are provided to insure this spaced relation. As indicated, coil P is a continuous coil covering the full length of the outer rectangular spool and coil S is a segmental coil with each segment regularly spaced and having an equal number of turns. The terminals of each of these segments are preferably carried outside of the coils P and are arranged so that the segments may be used individually or collectively as a secondary S. When the segments are electrically connected in series and used collectively as a secondary S, the voltage induced therein by the magnetic current bears the same relation to the magnetic current as though the coil was a continuously wound secondary.

Within the core area of the rectangular spool 54 means such as extensions 57 (Fig. 5) are provided to sustain panels 58—58 in spaced relation providing a space gap therebetween approximately along the core axis for the location of test sheet T therein. Coils H are located above and below the panels 58—58 within the core of secondary coil S. In Fig. 4 coils H are indicated as comprising a plurality (6) of coils, and spacer means 59 are provided to prevent any buckling of the panel members 58—58 and to provide separate compartments for the plurality of coils H.

Adjacent each end of the secondary S and in the space gap between the primary P and secondary S, I locate coils L—L' substantially as indicated in Fig. 3.

Slit openings are provided in end sections 55 as indicated (Fig. 7) to permit the insertion of sheet T within the core opening area defined by panels 58—58.

Any convenient means may be provided to horizontally sustain this coil assembly upon frame V—V. My preferred means is that indicated in Fig. 3 which consists of a wooden platform 60 sustained at opposite ends by the frame V and upon which the coil structure is fixedly located.

The general assembly indicated in Figs. 2 to 7 inclusive has proven very effective for the purposes of the present invention.

Having broadly and specifically disclosed the present invention and described one specific embodiment of the same, it is apparent that the same may be widely modified without essentially departing from the nature and scope thereof, and all such modifications and adaptations are contemplated as may fall within the following claims.

What I claim is:

1. The method of determining the energy losses in a determined portion of the length of a specimen while an alternating magnetic flux is passing therethrough which comprises inducing a magnetic flux of desired flux density and of essentially sinusoidal character within the specimen, superposing on said flux one or more induced harmonics thereof in an amount at least sufficient to balance out distortion in the sine wave form of said magnetic flux, and measuring the sinusoidal electromotive force induced within a secondary coil covering the said determined portion of the length of the specimen.

2. The method of measuring energy losses in a specimen which comprises inducing an alternating magnetic flux having a desired flux density within the specimen, superposing various induced harmonics of said flux thereon in such amounts as to substantially eliminate distortion of the sine wave form of said magnetic flux, and measuring the electromotive force induced in a secondary coil winding covering a determined portion of the length of the specimen wherein leakage fluxes perpendicular to the coil axis are substantially absent.

3. Apparatus for testing materials which comprises means to sustain the material as a part of a closed magnetic circuit, means for inducing a determined sinusoidal alternating magnetic flux in said circuit, means for eliminating distortion in the sine wave characteristics of said flux, and means for measurng the energy losses occurring in a determined portion of the length of the material intermediate the ends thereof wherein leakage fluxes perpendicular to the surface of the material are substantially absent.

4. Apparatus for testing materials which comprises means to sustain said material as a part of a closed magnetic circuit, means to induce a determined alternating magnetic flux in said circuit of essentially sinusoidal characteristics, means to correct any distortion in the sine wave characteristic of said flux, and means to measure the energy losses in a determined portion of the length of said material intermediate the ends thereof wherein leakage fluxes perpendicular to the surface of the material are substantially absent.

5. Apparatus for testing materials comprising means to sustain said material as a part of a closed magnetic circuit, a magnetizing coil having a primary winding substantially covering the length of said material forming a part of said closed magnetic circuit and having a secondary covering a determined center length of the said material, means to impress a substantially sinusoidal voltage on the said primary coil, means to correct distortion in the sine wave characteristics of the alternating magnetic flux thereby induced in the said closed magnetic circuit, means to eliminate leakage flux perpendicular to the coil axis at least in that portion of the material covered by the said secondary winding, and means to measure the electromotive force induced in the secondary coil by the said corrected magnetic flux.

6. Apparatus for testing materials comprising a yoke element provided with a space gap, means to sustain the said material in bridging relation across said space gap to form with said yoke a substantially closed magnetic circuit, means to induce a determined sinusoidal magnetic flux in said circuit, means to correct distortion in the sine wave characteristics of said flux, means to eliminate leakage flux perpendicular to the surface of the material over at least a determined portion of the length bridging said space gap and means to measure the energy losses in said determined portion of the length of said material.

7. Apparatus for testing materials comprising a yoke element provided with a space gap, means to sustain the said material in a position bridging said gap and forming with the yoke a substantially closed magnetic path, an electromagnetic coil having a primary winding surrounding the length of said material across said space gap and a secondary surrounding a determined length of the material less than the total length across said gap, means to apply to said primary winding a voltage of essentially sinusoidal characteristics, means to eliminate the sine wave distortion in the induced magnetic flux in the said material, means to eliminate leakage flux perpendicular to the coil axis within at least that portion of the material covered by the said secondary and means to measure the electromotive force induced in the secondary winding of said coil.

8. Apparatus for testing materials comprising a yoke element provided with a space gap, means to sustain the said material with a length thereof across said space gap in a position to form with the yoke a substantially closed magnetic circuit, hollow core electromagnetic coil having a primary winding covering substantially the entire length of said material closing said gap and a secondary winding covering a shorter central portion of said length of material, means to apply a substantially sinusoidal voltage to said primary winding, means to eliminate distortion in the sine wave characterstics of the magnetic flux thereby induced in said closed magnetic circuit, means to eliminate leakage flux perpendicular to the coil axis within at least that porton of the material covered by the said secondary and means for measuring the sinusoidal electromotive force induced in said secondary winding.

9. In the combination of claim 8, said means to eliminate distortion comprising means to impress various harmonics of said magnetizing current upon said magnetizing current in such amounts as is adapted to restore a substantially pure sine wave characteristic to the said magnetic flux.

10. In the combination of claim 8, said means to eliminate distortion including means to superpose the effect of at least one harmonic of the said magnetizing current upon the magnetic flux in said closed magnetic circuit in an amount at least adapated to bring the form factor of the induced electromotive force in a secondary winding to approximately 1.111.

11. In the combination of claim 8, adjusting the yoke compensation to satisfy the formula $H=.4\pi NI$ where N equals turns per unit length in primary winding and I equals magnetizing current in amperes, and said means to eliminate distortion including means to superpose the effect of at least one harmonic of the said magnetizing current upon the magnetic flux in said closed magnetic circuit in an amount at least adapted to bring the form factor of the induced electromotive force in a secondary winding to approximately 1.111.

12. A magnetic tester device comprising a hollow core electromagnetic coil having a primary winding and a secondary winding with said primary winding enclosing and extending beyond each end of the secondary winding, a yoke disposed to provide a space gap through the hollow core of said coil and a magnetic path about the exterior of the coil, means to sustain a specimen across said space gap and through said hollow core opening in a position relative to the yoke to form therewith a substantially closed magnetic path, means to energize said primary coil with a determined magnetizing current to induce a magnetic flux of desired flux density in the said specimen, means to correct the wave form of said induced flux to one of purely sinusoidal characteristics, means to eliminate leakage flux perpendicular to the coil axis at least in that portion of the specimen covered by the said secondary and means to measure the electromotive force induced by said corrected magnetic flux in said secondary.

13. In the device of claim 12, said means to correct the wave form of said magnetic flux comprising means to superpose various induced harmonics of said magnetizing current onto the magnetic flux in such amounts as to substantially correct the distortion normally present in the sine wave form of said magnetic flux.

14. The method of determining the magnetic permeability of a material which comprises applying an induced magnetic flux to a determined length of said material, determining the maximum value of the magnetizing force in terms of current when the wave form of the magnetizing current approximates a sine wave, determining the maximum value of the flux density of the said magnetic flux in terms of average induced secondary voltage along said determined length during any half cycle, and then determining the ratio between these two values.

15. The method of determining the maximum value of a magnetizing force applied to a specimen which comprises passing the magnetizing current through an ammeter electrically connected in series with a filter to convert the wave form of the magnetizing current to a sine wave form, and multiplying the meter reading thereby obtained by the factor 1.414 to obtain the maximum value of the magnetizing force.

16. The method of determining the maximum value of the alternating flux density in a specimen which comprises rectifying the alternating electromotive force induced in a secondary coil covering a determined portion of the length of said specimen wherein leakage flux perpendicular to the specimen is substantially absent and measuring the mean value of said rectified electromotive force.

17. The method of determining the energy losses occurring in a determined portion of the length of a specimen while an alternating magnetic flux is passing therethrough which comprises including the specimen within a closed magnetic circuit, inducing a magnetic flux in the circuit, adjusting the flux in the specimen to a desired flux density, eliminating substantially all distortion in the wave form of said flux, uniformly distributing the flux throughout said determined portion of the specimen, eliminating leakage flux perpendicular to the surface of the specimen over at least a determined portion of the length of the specimen and measuring the electromotive force induced by said undistorted magnetic flux within a secondary coil covering the said determined portion of the length of the specimen.

18. The method of determining the energy losses in a determined portion of the length of a specimen while an alternating magnetic flux is passing therethrough which comprises including the specimen within a closed magnetic circuit inducing a magnetic flux within the crcuit, adjusting the flux to a desired flux density, correcting the flux to substantially sinusoidal wave form, eliminating leakage flux perpendicular to the surface of the specimen in at least a determined portion of the length of the specimen, and measuring the electromotive force induced by said corrected flux within a secondary covering the said determined portion of the length of the specimen.

19. The method of determining energy losses along a determined portion of the length of a specimen which comprises including the specimen as a part of a closed magnetic circuit, inducing an alternating magnetic flux of desired flux density and of purely sinusoidal characteristics in the circuit, eliminating leakage flux perpendicular to the surface of the specimen in at least a determined portion of the length of the specimen, and measuring the sinusoidal electromotive force induced in a secondary coil covering the said determined portion of the length of the specimen.

20. The method of determining the energy losses along a determined portion of the length of a specimen which comprises including the specimen as a part of a closed magnetic circuit, inducing a purely sinusoidal alternating magnetic flux of desired flux density and of determined magnitude in said circuit, eliminating leakage flux perpendicular to the surface of the specimen in at least a determined portion of the length of the specimen, and measuring the electromotive force induced thereby within a secondary coil covering the said determined portion of the length of the specimen.

WILLIAM E. SHENK.